United States Patent
Singh et al.

(10) Patent No.: US 7,330,323 B1
(45) Date of Patent: Feb. 12, 2008

(54) DISK DRIVE DETERMINING A HEAD-SWITCH PREHEAT PERIOD USED TO FORMAT A DISK

(75) Inventors: Dalwinder Singh, Irvine, CA (US); Gregory B. Thelin, Garden Grove, CA (US); Jonathan V. Nguyen, Laguna Niguel, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 220 days.

(21) Appl. No.: 11/169,038

(22) Filed: Jun. 28, 2005

(51) Int. Cl.
*G11B 5/09* (2006.01)

(52) U.S. Cl. .............................. 360/48; 360/31; 360/75

(58) Field of Classification Search ...................... None
See application file for complete search history.

(56) References Cited

U.S. PATENT DOCUMENTS

| | | | |
|---|---|---|---|
| 4,777,544 A | 10/1988 | Brown et al. | |
| 5,377,058 A | 12/1994 | Good et al. | |
| 5,410,439 A | 4/1995 | Egbert et al. | |
| 5,627,695 A * | 5/1997 | Prins et al. | 360/51 |
| 5,831,781 A | 11/1998 | Okamura | |
| 5,909,330 A | 6/1999 | Carlson et al. | |
| 5,991,113 A | 11/1999 | Meyer et al. | |
| 6,034,837 A | 3/2000 | Purkett | |
| 6,249,393 B1 | 6/2001 | Billings et al. | |
| 6,388,413 B1 | 5/2002 | Ng et al. | |
| 6,493,171 B2 | 12/2002 | Enokida et al. | |
| 6,501,606 B2 | 12/2002 | Boutaghou et al. | |
| 6,577,466 B2 | 6/2003 | Meyer et al. | |
| 6,691,213 B1 | 2/2004 | Luu et al. | |
| 6,700,724 B2 | 3/2004 | Riddering et al. | |
| 6,728,054 B2 | 4/2004 | Chng et al. | |
| 6,775,089 B1 | 8/2004 | Bonin et al. | |
| 6,775,103 B2 | 8/2004 | Kang et al. | |
| 6,785,081 B2 | 8/2004 | Chapin et al. | |
| 6,848,019 B1 | 1/2005 | Mobley et al. | |
| 6,950,266 B1 | 9/2005 | McCaslin et al. | |
| 6,972,919 B2 * | 12/2005 | Suk | 360/75 |
| 7,042,674 B1 | 5/2006 | Baril et al. | |
| 2002/0176208 A1 | 11/2002 | Serpe et al. | |
| 2003/0058559 A1 | 3/2003 | Brand et al. | |
| 2004/0075940 A1 | 4/2004 | Bajorek et al. | |
| 2004/0150904 A1 | 8/2004 | Schell et al. | |
| 2004/0190175 A1 | 9/2004 | Chey et al. | |
| 2004/0240109 A1 | 12/2004 | Hamann et al. | |

(Continued)

FOREIGN PATENT DOCUMENTS

WO      WO 02/19330 A1      3/2002

*Primary Examiner*—Andrea Wellington
*Assistant Examiner*—Varsha A. Kapadia
(74) *Attorney, Agent, or Firm*—Howard H. Sheerin, Esq.

(57) ABSTRACT

A disk drive is disclosed comprising a disk having a plurality of tracks, wherein each track comprises a plurality of data sectors. The disk drive further comprises a plurality of heads, such as a top head and a bottom head. Control circuitry within the disk drive determines a head-switch preheat period used to format the disk. The head-switch preheat period is calibrated by selecting one of the heads to write a test pattern to the disk, and then preheating the selected head for a preheat period prior to reading the test pattern from the disk to generate a read signal. The head-switch preheat period is determined for the selected head in response to the read signal.

18 Claims, 4 Drawing Sheets

U.S. PATENT DOCUMENTS

2005/0052773 A1    3/2005   Suk
2005/0057841 A1*   3/2005   Stover et al. ................. 360/59
2005/0078566 A1    4/2005   Wilson et al.
2006/0092570 A1*   5/2006   Payne et al. ............. 360/236.5
2006/0245100 A1*   11/2006  Satoh et al. ................... 360/1

* cited by examiner

DISK DRIVE DETERMINING A HEAD-SWITCH PREHEAT PERIOD USED TO FORMAT A DISK

BACKGROUND OF THE INVENTION

1. Field of the Invention

The present invention relates to disk drives for computer systems. More particularly, the present invention relates to a disk drive determining a head-switch preheat period used to format a disk.

2. Description of the Prior Art

In disk drives, a head is actuated radially over a disk in order to access a target track recorded on the disk. The head is attached to a distal end of an actuator arm which is rotated about a pivot by a voice coil motor during seek operations. As the disk rotates, an air bearing forms which causes the head to "fly" just above the disk surface while writing magnetic transitions during a write operation, or reading the magnetic transitions during a read operation. The head comprises a slider having an air bearing surface and an integrated transducer, such as a write coil and a magnetoresistive read element.

Decreasing the distance between the transducer and disk surface (fly-height) improves the signal-to-noise ratio in the read signal, thereby enabling higher recording densities (radial tracks per inch and linear bits per inch). To this end, designers have exploited the thermal expansion properties of the head (e.g., the slider and/or transducer) by incorporating a heater to control the temperature of the head and thereby the fly-height. Increasing the temperature causes the head to expand, thereby moving the transducer closer to the disk surface.

Prior art disk drives typically employ multiple heads (e.g., top and bottom heads) and may also employ multiple disks with corresponding top and bottom heads. Typically only one head is active at a time for accessing data sectors recorded in tracks of the corresponding disk surface. When the disk drive performs a head-switch to access a different disk surface, the preheat period required to heat the newly selected head can result in a slipped revolution if the head does not attain an acceptable fly-height prior to reaching the target data sector.

There is, therefore, a need to decrease the fly-height in a disk drive by heating the head without increasing the access time of the disk drive during a head-switch operation.

SUMMARY OF THE INVENTION

An embodiment of the present invention comprises a disk drive comprising a disk having a plurality of tracks, wherein each track comprises a plurality of data sectors. The disk drive further comprises a plurality of heads, such as a top head and a bottom head. Control circuitry within the disk drive determines a head-switch preheat period used to format the disk. The head-switch preheat period is calibrated by selecting one of the heads to write a test pattern to the disk, and then preheating the selected head for a preheat period prior to reading the test pattern from the disk to generate a read signal. The head-switch preheat period is determined for the selected head in response to the read signal.

In one embodiment, the control circuitry measures a fly-height of the selected head from the read signal, and determines the head-switch preheat period in response to the measured fly-height. In one embodiment, the control circuitry extrapolates the head-switch preheat period from the measured fly-height.

In another embodiment, the control circuitry switches from a second one of the heads to the selected head during a head-switch operation, preheats the selected head for the head-switch preheat period, and accesses a data sector using the selected head after the head-switch preheat period and within a single revolution of the disk.

In yet another embodiment, the control circuitry formats the disk by mapping a logical block address to a physical block address corresponding to at least one of the data sectors. In one embodiment, the control circuitry maps a first and second consecutive logical block address. The first logical block address is mapped to a first physical block address corresponding to at least one of the data sectors on the first disk surface, and the second logical block address is mapped to a physical block address corresponding to at least one of the data sectors on the second disk surface, wherein the first physical block address is separated from the second physical block address by a distance corresponding to the head-switch preheat period.

In still another embodiment, the control circuitry adjusts the preheat period for preheating the head, rereads the test pattern from the disk using the selected head to generate a second read signal, and determines the head-switch preheat period in response to the read signal and the second read signal. In one embodiment, the control circuitry extrapolates the head-switch preheat period from the read signal and the second read signal.

In yet another embodiment, the disk further comprises a plurality of servo sectors, and the preheat period is adjusted by an interval corresponding to the delay between reading each servo sector.

Another embodiment of the present invention comprises a method of operating a disk drive, the disk drive comprising a disk including a plurality of tracks, wherein each track comprises a plurality of data sectors. The disk drive further comprises a plurality of heads, such as a top head and a bottom head. A head-switch preheat period is calibrated for a selected one of the heads by using the selected head to write a test pattern to the disk, and then preheating the selected head for a preheat period prior to reading the test pattern from the disk to generate a read signal. The head-switch preheat period is determined for the selected head in response to the read signal.

DESCRIPTION OF THE PREFERRED EMBODIMENTS

Figure 1:
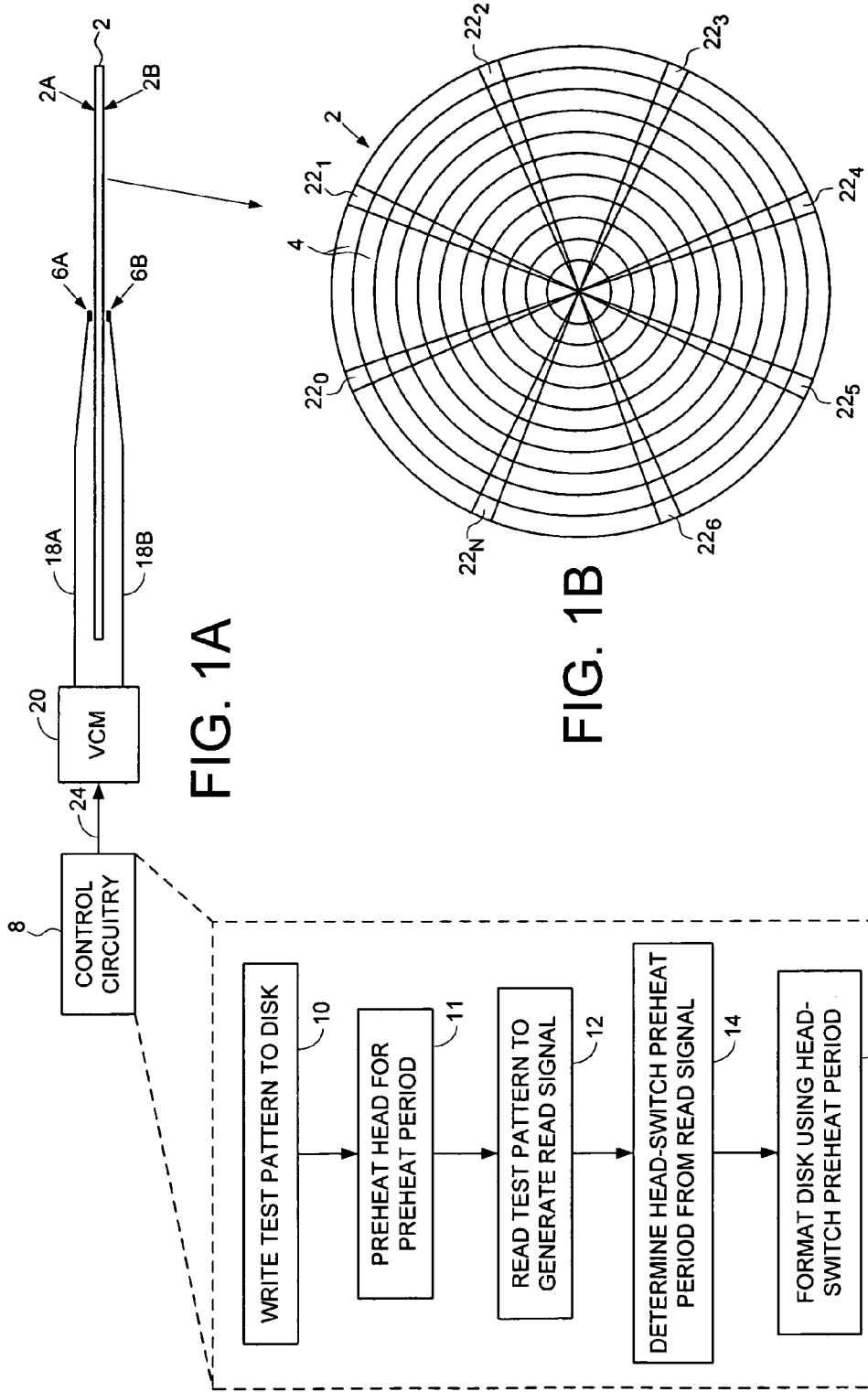
FIG. 1A shows a disk drive according to an embodiment of the present invention comprising a disk and a plurality of heads, such as a top and bottom head.
FIG. 1B shows an example format of the disk, including a plurality of tracks divided into a number of data sectors and a number of embedded servo sectors.
FIG. 1C is a flow diagram according to an embodiment of the present invention for determining a head-switch preheat period by writing/reading a test pattern and evaluating the read signal.

FIG. 1A shows a disk drive according to an embodiment of the present invention comprising a disk 2 having a plurality of tracks 4 (FIG. 1B), wherein each track 4 comprises a plurality of data sectors. The disk drive further comprises a plurality of heads, such as a top head 6A actuated over a top surface 2A of the disk and a bottom head 6B actuated over a bottom surface of the disk. Control circuitry 8 within the disk drive determines a head-switch preheat period used to format the disk 2. As shown in the flow diagram of FIG. 1C, the head-switch preheat period is calibrated by selecting one of the heads to write a test pattern to the disk at step 10, and then preheating the selected head at step 11 for a preheat period prior to reading the test pattern from the disk at step 12 to generate a read signal. At step 14 the head-switch preheat period is determined for the selected head in response to the read signal, and at step 16 the disk is formatted in response to the head-switch preheat period.

Any suitable control circuitry 8 may be employed to implement the embodiments of the present invention. In one embodiment, the control circuitry 8 comprises a microprocessor executing instructions, the instructions being operable to cause the microprocessor to perform the steps of FIG. 1C as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 8 comprises suitable logic circuitry, such as state machine circuitry.

In the embodiment of FIG. 1A, the top and bottom heads 6A and 6B are connected to the distal end of respective actuator arms 18A and 18B, which are rotated about a pivot by a voice coil motor (VCM) 20 in order to actuate the heads over the disk. As shown in the embodiment of FIG. 1B, embedded servo sectors $22_0$-$22_N$ are written on the top and bottom disk surfaces 2A and 2B to facilitate positioning a selected one of the heads over a target track during write/read operations. Each embedded servo sector comprises coarse head positioning information, such as a track address, and fine head positioning information, such as servo bursts recorded at precise offsets from the track's centerline. The control circuitry 8 demodulates the servo sectors $22_0$-$22_N$ to determine the actual position of the head which is subtracted from a target position (target track) to generate a control signal 24 applied to the VCM 20.

Also in the embodiment of FIG. 1A, the heads 6A and 6B are heated in order to decrease the fly-height during write/read operations. Any suitable technique to heat the heads 6A and 6B may be employed in the embodiments of the present invention, and the heating may expand/contract any suitable feature of the head. For example, in one embodiment the head comprises a slider fabricated from a suitable material (e.g., ceramic) that incorporates a transducer, wherein the heat expands a feature of the slider, for example, by passing a current through a heating element incorporated into the slider. In an alternative embodiment, the transducer is fabricated with material that expands with temperature, wherein current passing through the transducer or through a heating element attached to the transducer expands the transducer to control the fly-height.

During operation, only one of the heads is active, meaning that only one of the disk surfaces can be accessed during a write/read operation, and in one embodiment, only the active head is heated in order to reduce the fly-height. Therefore during a head-switch operation, when the disk drive switches between heads (e.g., from the top head 6A to the bottom head 6B), there is a preheat period associated with heating the newly selected head to achieve the desired fly-height. Preheating the head is of particular concern for write operations to ensure data is written to the target track only after the head has attained the desired fly-height. The preheat period is illustrated in FIG. 2, which shows a head-switch operation from the top head 6A to the bottom head 6B and the corresponding preheat period before the bottom head 6B has reached an appropriate fly-height to allow a safe write operation.

Figure 2:
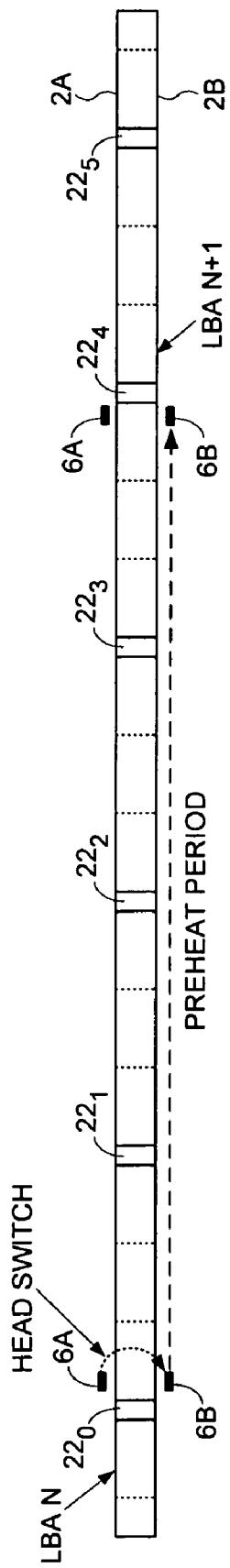
FIG. 2 illustrates how formatting the disk to account for the head-switch preheat period helps optimize the access time by minimizing slipped revolutions.

FIG. 2 also shows how in one embodiment the disk 2 is formatted by mapping a logical block address (LBA) to a physical block address (PBA) representing one of the data sectors recorded in a track. The LBA to PBA mapping facilitates the "mapping out" of defective data sectors, and in an embodiment of the present invention, also helps optimize the access time of the disk drive by compensating for the head-switch preheat period. This is illustrated in FIG. 2 wherein after accessing LBA N the disk drive performs a head-switch operation to switch from the top surface 2A to the bottom surface 2B. The next consecutive LBA address (LBA N+1) is mapped to a data sector following the head-switch preheat period for the bottom head 6B. This helps minimizes the rotational latency of the disk since the next consecutive LBA can be accessed soon after the bottom head 6B reaches its target fly-height.

Figure 3:
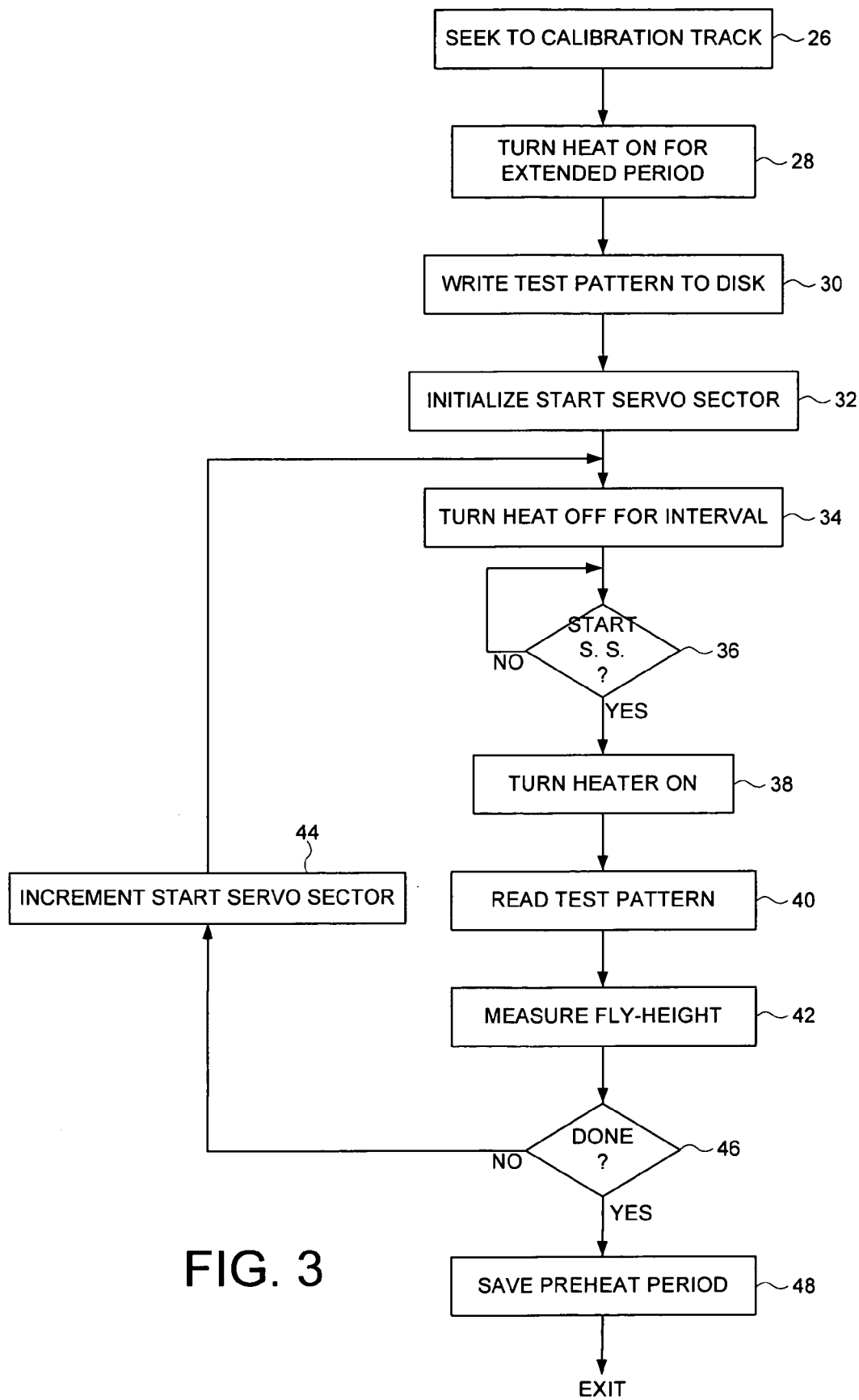
FIG. 3 is a flow diagram according to an embodiment of the present invention for determining the head-switch preheat period by measuring a delay required for the head to achieve a target fly-height.

FIG. 3 shows a flow chart according to an embodiment of the present invention for measuring the head-switch preheat period for each head. At step 26 the control circuitry 8 seeks the head to a calibration track, and at step 28 turns the heating on for an extended period to ensure the head reaches a target fly-height. When the head reaches a selected data sector, at step 30 a test pattern is written to the disk. At step 32 a starting servo sector is chosen to correspond to a servo sector that precedes the test pattern by a predetermined interval (i.e., a predetermined number of servo sectors preceding the data sector storing the test pattern). At step 34 the heating is turned off for a predetermined interval (e.g., a predetermined number of servo sectors) to allow the fly-height to increase. When the head reaches the starting servo sector at step 36, the heating is turned back on at step 38 to decrease the fly-height. When the head reaches the data sector storing the test pattern, at step 40 the test pattern is read, and at step 42 the read signal is evaluated to determine the fly-height. At step 44 the starting servo sector is changed (e.g., to increase the preheat period), and the process repeated starting at step 34 until a predetermined number of preheat periods have been evaluated at step 46, or until the fly-height reaches a predetermined target fly-height at step 46. At step 48 the preheat period that achieves the target fly-height is saved and used by the control circuitry 8 to format the disk.

In one embodiment, the flow diagram of FIG. 3 is executed for each head, and the disk drive is formatted using the largest head-switch preheat period. In another embodiment, each disk surface is formatted optimally in response to the head-switch preheat period for the corresponding head. In addition, each disk surface may be formatted using any suitable sequence, such as a serpentine sequence, an alternating sequence between disk surfaces, or a combination of both depending on the zone.

The fly-height may be determined at step 42 of FIG. 3 using any suitable technique in response to the read signal while reading the test pattern. In one embodiment, the fly-height is determined using a "Harmonic Ratio Fly-height" or HRF technique wherein the read signal is sampled at first and third harmonic rates, and the logarithmic ratio of the two sampled signals is computed. Another technique for measuring the fly-height is disclosed in U.S. Pat. No. 6,249,393, the disclosure of which is incorporated herein by reference. In another embodiment the fly-height need not be determined. Instead, the head-switch preheat period may be determined based on the quality of the read signal, which is typically correlated with the fly-height.

Figure 4A:
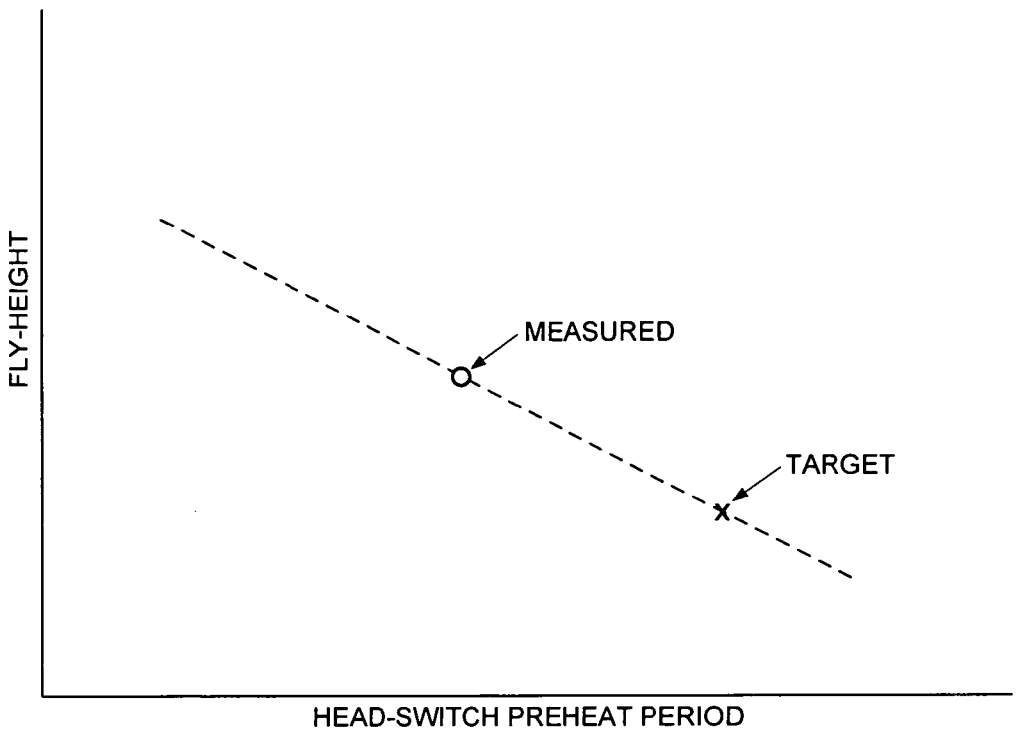
FIG. 4A illustrates an embodiment of the present invention wherein the head-switch preheat period is extrapolated from a single fly-height measurement.

FIG. 4A illustrates an embodiment of the present invention wherein the head-switch preheat period is extrapolated from a single fly-height measurement. In this embodiment, the relationship between the preheat period and fly-height is essentially the same from drive to drive except for an unknown offset. Taking a single fly-height measurement after a predetermined preheat period enables the control circuitry 8 to determine the offset, and thereby determine the head-switch preheat period through extrapolation.

Figure 4B:
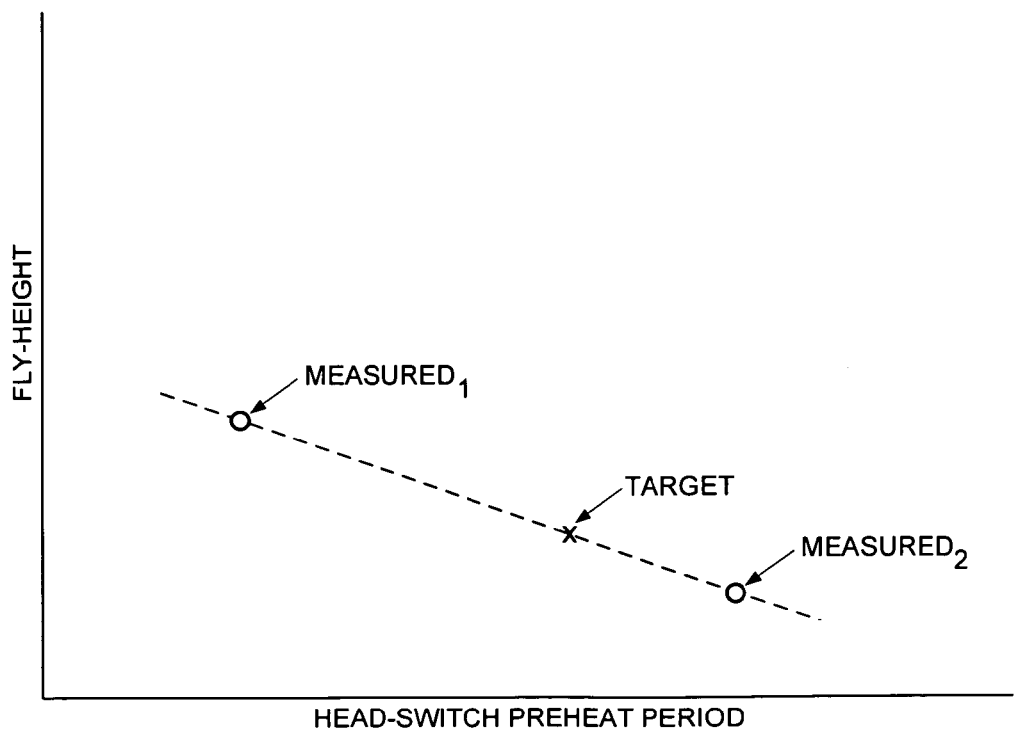
FIG. 4B illustrates an embodiment of the present invention wherein the head-switch preheat period is extrapolated from multiple fly-height measurements.

In an alternative embodiment shown in FIG. 4B, the relationship between the preheat period and fly-height, including the polynomial that defines the relationship, varies from drive to drive. In this embodiment, multiple fly-height measurements are taken by reading the test pattern using different preheat periods, and the polynomial that defines the relationship between the preheat period and fly-height is estimated using a curve fitting algorithm. The head-switch preheat period is then determined through extrapolation using the estimated polynomial.

We claim:

1. A disk drive comprising:
   (a) a disk comprising a plurality of tracks, wherein each track comprises a plurality of data sectors;
   (b) a plurality of heads; and
   (c) control circuitry operable to:
      select one of the heads to write a test pattern to the disk;
      preheat the selected head for a preheat period;
      read the test pattern from the disk using the selected head to generate a read signal;
      determine a head-switch preheat period for the selected head in response to the read signal; and
      format the disk in response to the head-switch preheat period.

2. The disk drive as recited in claim 1, wherein the control circuitry is further operable to:
   (a) measure a fly-height of the selected head from the read signal; and
   (b) determine the head-switch preheat period in response to the measured fly-height.

3. The disk drive as recited in claim 1, wherein the control circuitry is further operable to:
   (a) switch from a second one of the heads to the selected head during a head-switch operation;
   (b) preheat the selected head for the head-switch preheat period; and
   (c) access a data sector using the selected head after the head-switch preheat period and within a single revolution of the disk.

4. The disk drive as recited in claim 1, wherein the control circuitry is operable to format the disk by mapping a logical block address to a physical block address corresponding to at least one of the data sectors.

5. The disk drive as recited in claim 4, wherein:
   (a) the disk drive further comprises a first disk surface and a second disk surface; and
   (b) the control circuitry is further operable to:
      map a first and second consecutive logical block address;
      map the first logical block address to a first physical block address corresponding to at least one of the data sectors on the first disk surface; and
      map the second logical block address to a physical block address corresponding to at least one of the data sectors on the second disk surface, wherein the first physical block address is separated from the second physical block address by a distance corresponding to the head-switch preheat period.

6. The disk drive as recited in claim 1, wherein the control circuitry is further operable to:
   (a) adjust the preheat period for preheating the head;
   (b) reread the test pattern from the disk using the selected head to generate a second read signal; and
   (c) determine the head-switch preheat period in response to the read signal and the second read signal.

7. The disk drive as recited in claim 6, wherein:
   (a) the disk further comprises a plurality of servo sectors; and
   (b) the control circuitry is further operable to adjust the preheat period by an interval corresponding to the delay between reading each servo sector.

8. The disk drive as recited in claim 2, wherein the control circuitry is operable to extrapolate the head-switch preheat period from the measured fly-height.

9. The disk drive as recited in claim 6, wherein the control circuitry is operable to extrapolate the head-switch preheat period from the read signal and the second read signal.

10. A method of operating a disk drive, the disk drive comprising a disk including a plurality of tracks, wherein each track comprises a plurality of data sectors, the disk drive further comprising a plurality of heads, the method comprising the steps of:
   (a) calibrating a head-switch preheat period for a selected one of the heads by:
      writing a test pattern to the disk using the selected head;
      preheating the selected head for a preheat period;
      reading the test pattern from the disk using the selected head to generate a read signal; and
      determining a head-switch preheat period for the selected head in response to the read signal; and
   (b) formatting the disk in response to the head-switch preheat period.

11. The method as recited in claim 10, further comprising the steps of:
   (a) measuring a fly-height of the selected head from the read signal; and
   (b) determining the head-switch preheat period in response to the measured fly-height.

12. The method as recited in claim 10, further comprising the steps of:
   (a) switching from a second one of the heads to the selected head during a head-switch operation;
   (b) preheating the selected head for the head-switch preheat period; and (c) accessing a data sector using the selected head after the head-switch preheat period and within a single revolution of the disk.

13. The method as recited in claim 10, wherein the step of formatting the disk comprises the step of mapping a logical block address to a physical block address corresponding to at least one of the data sectors.

14. The method as recited in claim 13, wherein:
(a) the disk drive further comprises a first disk surface and a second disk surface; and
(b) the step of formatting the disk comprises the steps of:
mapping a first logical block address to a first physical block address corresponding to at least one of the data sectors on the first disk surface; and
mapping a second logical block address to a physical block address corresponding to at least one of the data sectors on the second disk surface, wherein:
the first and second logical block addresses are consecutive; and
the first physical block address is separated from the second physical block address by a distance corresponding to the head-switch preheat period.

15. The method as recited in claim 10, further comprising the steps of:
(a) adjusting the preheat period for preheating the head;
(b) rereading the test pattern from the disk using the selected head to generate a second read signal; and
(c) determining the head-switch preheat period in response to the read signal and the second read signal.

16. The method as recited in claim 15, wherein:
(a) the disk further comprises a plurality of servo sectors; and
(b) the preheat period is adjusted by an interval corresponding to the delay between reading each servo sector.

17. The method as recited in claim 11, further comprising the step of extrapolating the head-switch preheat period from the measured fly-height.

18. The method as recited in claim 15, further comprising the step of extrapolating the head-switch preheat period from the read signal and the second read signal.

* * * * *